TERNARY DIGITAL COMPUTER CIRCUITS

Filed Jan. 11, 1967 8 Sheets-Sheet 1

INVENTOR
CLAUDE P. BATTAREL
BY,
Kenway, Jenney & Hildreth
ATTORNEYS

INVENTOR
CLAUDE P. BATTAREL
BY,
Kenway, Jenney & Hildreth
ATTORNEYS

INVENTOR
CLAUDE P. BATTAREL
BY,
Kenway, Jenney & Hildreth
ATTORNEYS

May 26, 1970 C. P. BATTAREL 3,514,584

TERNARY DIGITAL COMPUTER CIRCUITS

Filed Jan. 11, 1967 8 Sheets-Sheet 4

INVENTOR
CLAUDE P. BATTAREL
BY,
Kenway, Jenney & Hildreth
ATTORNEYS

INVENTOR
CLAUDE P. BATTAREL
BY,
Kenway, Jenney & Hildreth
ATTORNEYS

INVENTOR
CLAUDE P. BATTAREL
BY,
Kenway, Jenney & Hildreth
ATTORNEYS

TERNARY DIGITAL COMPUTER CIRCUITS

Filed Jan. 11, 1967 8 Sheets-Sheet 7

INVENTOR
CLAUDE P. BATTAREL
BY,
Kenway, Jenney & Hildreth
ATTORNEYS

INVENTOR
CLAUDE P. BATTAREL
BY,
Kenway, Jenney & Hildreth
ATTORNEYS

United States Patent Office 3,514,584
Patented May 26, 1970

3,514,584
TERNARY DIGITAL COMPUTER CIRCUITS

Claude P. Battarel, Magagosc-de-Grasse, Alpes-Maritimes, France, assignor, by mesne assignments, to Epsco Incorporated, Westwood, Mass., a corporation of Massachusetts Filed Jan. 11, 1967, Ser. No. 608,554
Int. Cl. G06f *7/38, 15/20;* G06j *1/02*
U.S. Cl. 235—156 7 Claims

ABSTRACT OF THE DISCLOSURE

A digital operational computer comprising a ternary pulse multiplier made from tristable counters and registers. One embodiment includes three electronic switches per ternary stage. The full specification should be consulted for an understanding of the invention.

My invention relates to digital computers, and particularly to novel ternary digital computer circuits.

General purpose digital computers may be programmed to solve essentially any problem that can be formulated in terms of a finite sequence of operations. However, for many purposes it has been found that more specialized and less flexible machines are more economical. For example, one form of specialized computer, developed for the purpose of solving differential equations, is the digital differential analyzer. A computer of this type comprises a series of integrators. Each integrator comprises an integrand register, an adder and a result register, which can be programmed to perform a rectangular or trapezoidal integration by successive additions of the contents of the integrand register into the result register. Such integrators can be interconnected in various networks to solve a wide variety of equations. More recently, digital operational computers have been developed which make use of binary and sometimes decimal pulse multipliers. Pulse multipliers comprise apparatus for multiplying a train of pulses by a binary fraction to supply a train of output pulses equal in number to the binary fraction times the number of input pulses. If the binary fraction applied to a pulse multiplier is proportional to the value of a dependent variable, and the pulse input train represents successive increments of an independent variable, the pulse multiplier output pulses are proportional in number to the increments of the integral of the dependent variable with respect to the independent variable. The output pulses so produced may be used directly, or accumulated in a register to represent the integral. Integrators so formed may be interconnected and programmed in a manner analogous to the use of the integrators of a digital differential analyzer. However, a computer in which the basic building block is a pulse multiplier is inherently less complex and costly than a digital differential analyzer. The objects of my invention are to simplify the construction and increase the speed of pulse multipliers and digital computers made therefrom.

Briefly, the objects of my invention are attained by a ternary computing system making use of ternary registers and ternary pulse multipliers, which may be interconnected to form ternary integrators that can be further interconnected and programmed to solve any selected differential equation, or perform various other mathematical functions. The ternary registers employed in the apparatus of my invention comprise either tristable circuits or triads of simplified binary circuits each capable of representing a ternary digit. The tri-stable circuits may be interconnected to form ternary counters and registers. For use as a ternary pulse multiplier, one such register is provided with apparatus for indicating the transitions occuring as the register is advanced. This register is connected to a set of multiplier gates which are also connected to a ternary integrand register. The multiplier gates produce an output train of signals that can be utilized as a serial pulse rate or accumulated in either binary or ternary form for computational use as a word or number. In accordance with a preferred embodiment of my invention, the ternary circuits employed as the building blocks in the apparatus of my invention each comprise only three switches, such as transistors, tunnel diodes or the like, per stage, and thereby afford greater economy and speed than binary circuits of known construction for performing a similar function.

The manner in which the apparatus of my invention is constructed, and its mode of operation, will best be understood in the light of the following detailed description, together with the accompanying drawings, of various illustrative embodiments thereof.

Figure 1:
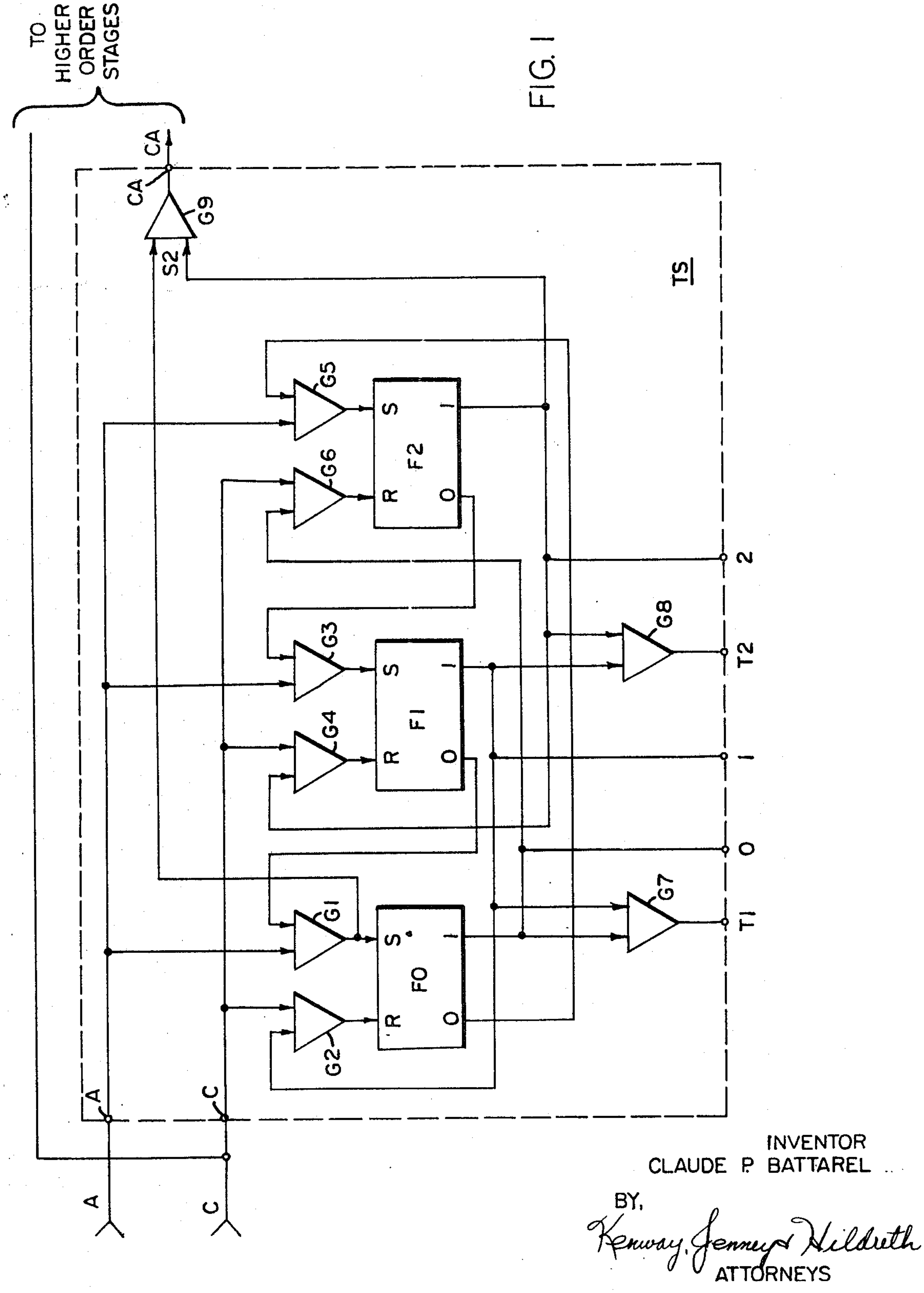
FIG. 1 is a schematic wiring diagram of a tri-stable circuit in accordance with one embodiment of my invention.

In FIG. 1, I have shown a ternary circuit TS useful as a single stage in a ternary counter. The apparatus basically comprises three "toggle switches," which may be any suitable bistable components but as here shown comprise three flip-flops F0, F1 and F2. These flip-flops may be of any conventional construction, but as here shown are of the type which produce a logic 1 output above ground potential at the output terminal labelled 1 when set by a positive pulse applied to the input terminal S, or when set by a similar pulse directly applied to the output terminal 1. Similarly, they may be reset by a positive pulse applied to an input terminal R or to an output terminal 0, whereupon the output terminal 0 will change to the logic 1 state and be positive with respect to ground whereas the logic 1 output terminal will then be at ground or logic 0. As will be apparent to those skilled in the art, other logical conventions could be used and other potentials could be used to represent the various logical truth values, those given being primarily for clarity of description.

A set of AND gates G1, G2, G3, G4, G5 and G6 are arranged to control the state of the flip-flops F0, F1 and F2. These gates may be of any conventional construction arranged to produce a position output logic 1 signal when and only when positive inut signals are applied to all the input terminals. As shown, the gate G1 has its output terminal connected to the set terminal S of the flip-flop F0, and the gate G2 has its output terminal connected to the reset input terminal R of the flip-flop F0. Similarly, the gate G3 is connected to the set terminal S of the flip-flop F1 and the gate G4 is connected to the reset terminal R of the flip-flop F1. The gate G5 has its output terminal connected to the input terminal S of the flip-flop F2, and the gate G6 has its output terminal connected to the reset input terminal R of the flip-flop F2.

The gates G1, G3 and G5 each have an input terminal connected to an input terminal A of the ternary stage TS. The terminal A is adapted to receive a positive-going pulse A when it is desired to advance the count in the stage TS by 1.

The gates G2, G4 and G6 each have one input terminal connected in parallel to an input terminal C of the stage TS, which is adapted to receive a positive-going clock pulse C following an "advance" pulse A. As will appear, an advance pulse A following by a clock pulse C will complete the transition of the stage from one state to the next. Each of the gates G1, G3 and G5 has another input terminal connected to the logic 0 output terminal of a different one of the flip-flops in the stage. Thus, the output terminal 0 of the flip-flop F1 is connected to the gtae G1, the output terminal 0 of the flip-flop F2 is connected to the gate G3, and the output terminal 0 of the flip-flop F0 is connected to the gate G5 to complete the ring. By this arrangement, each flip-flop can be set only when an advance pulse A is received and the next flip-flop in the sequence is in a logic 0 state. Each flip-flop can at times receive a setting pulse when it is already in the logic 1 (or "set") state, but such pulses will not change the state of the flip-flop.

Each of the reset gates G2, G4 and G6 has another input terminal connected to the logic 1 output terminal of an adjacent flip-flop. Thus, the gate G2 is connected to the logic 1 output terminal of the flip-flop F1, the gate G4 is connected to the logic 1 output terminal of the flip-flop F2, and the gate G6 is connected to the logic 1 output terminal of the flip-flop F0.

Transition pulses useful for various purposes, and particularly in the construction of the pulse multiplier to be described, are provided by a pair of AND gates G7 and G8. The gate G7 has two input terminals, one connected to the logic 1 output terminal of the flip-flop F0 and a second connected to the logic 1 output terminal of the flip-flop F1. As will appear, the gate G7 will produce a transition pulse T1 during the time when the stage TS is being set from the ternary 0 state to the ternary 1 state, at which time both flip-flops F0 and F1 will be set.

The gate G8 has a first input terminal connected to the logic 1 output terminal of the flip-flop F1, and a second input terminal connected to the logic 1 output terminal of the flip-flop F2. This gate produces an output pulse T2 during the setting of the stage TS from the ternary 1 state to the ternary 2 state, at which time both flip-flops F1 and F2 are set.

A "carry" pulse CA is produced by a gate G9. The gate G9 is an AND gate of any conventional construction, having a first input terminal connected to the output terminal of the gate G1, and a second input terminal connected to the logic 1 output terminal of the flip-flop F2. This gate produces a carry pulse CA at the time when the stage TS is set from the ternary 2 state to the ternary 0 state, at which time the flip-flop F0 is set and the flip-flop F2 is set and is about to be reset.

The carry pulse CA may be used as the advance pulse for application to the input terminal A of the next stage, when several stages TS are connected as a counter. The clock pulse C may be applied in parallel to all of the input terminals C of the several stages of a counter, as these pulses only affect a stage in a transition state.

Figure 2:
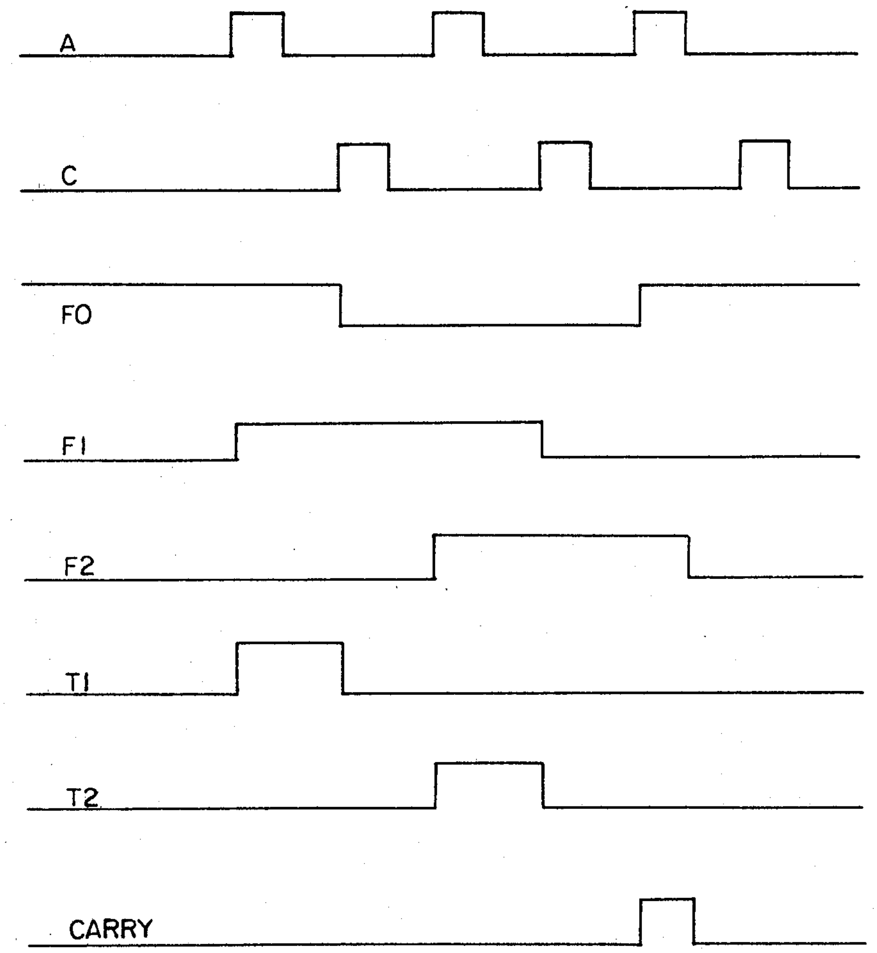
FIG. 2 is a timing chart illustrating the sequence of operation of the circuit of FIG. 1.

The opeartion of the apparatus of FIG. 1 will best be understood with reference to the timing diagram of FIG. 2. It is assumed that a series of advance pulses A are produced, each followed by a single clock pulse C. Such a series of pulses can be produced in any conventional manner, as by a pair of switches connected between the input terminals A and C and a suitable source of positive potential. If desired, the pulses C can be derived from the pulses A by the use of a delay line, multivibrator or the like. Assume that the stage TS is initially in the ternary 0 state, as may be accomplished by simultaneously applying a positive potential to the input terminal C and the output terminals 0 and 2 of the stage TS, to set the flip-flop F0 to its logic 1 state and the flip-flops F1 and F2 to their logic 0 states.

When the first A pulse is received, the flip-flop F1 will then be set by the A pulse and the logic 1 level at the 0 output terminal of the flip-flop F2 actuating the gate G3 to apply a positive potential to the set terminal S of the flip-flop F1. As the flip-flops F0 and F1 are now both set, the gate G8 will produce the output level T1, indicating the transition between 0 and 1.

When the C pulse is received following the first A pulse, the flip-flop F0 will be reset by the gate G2. The stage TS will then be in its ternary 1 state with the output terminal labelled 1 at a positive potential with respect to ground and the output terminals labelled 0 and 2 at ground potential.

When the second A pulse is produced, the flip-flop F2 will be set by the gate G5. The gate G8 will now produce the level T2, indicating the transition between 1 and 2.

At the next following C pulse, the flip-flop F1 will be reset by the gate G4, and the stage TS will then be in its ternary 2 state. At the next A pulse, the flip-flop F0 will be set by the gate G1, and the gate G9 will simultaneously produce a carry pulse CA for use as an advance pulse A in a succeeding stage of the counter. When the third C pulse is received, the flip-flop F2 will be reset by the gate G6. It will be apparent that the succeeding A and C pulses will cycle the stage through its three ternary states in a manner just described.

Figure 3:
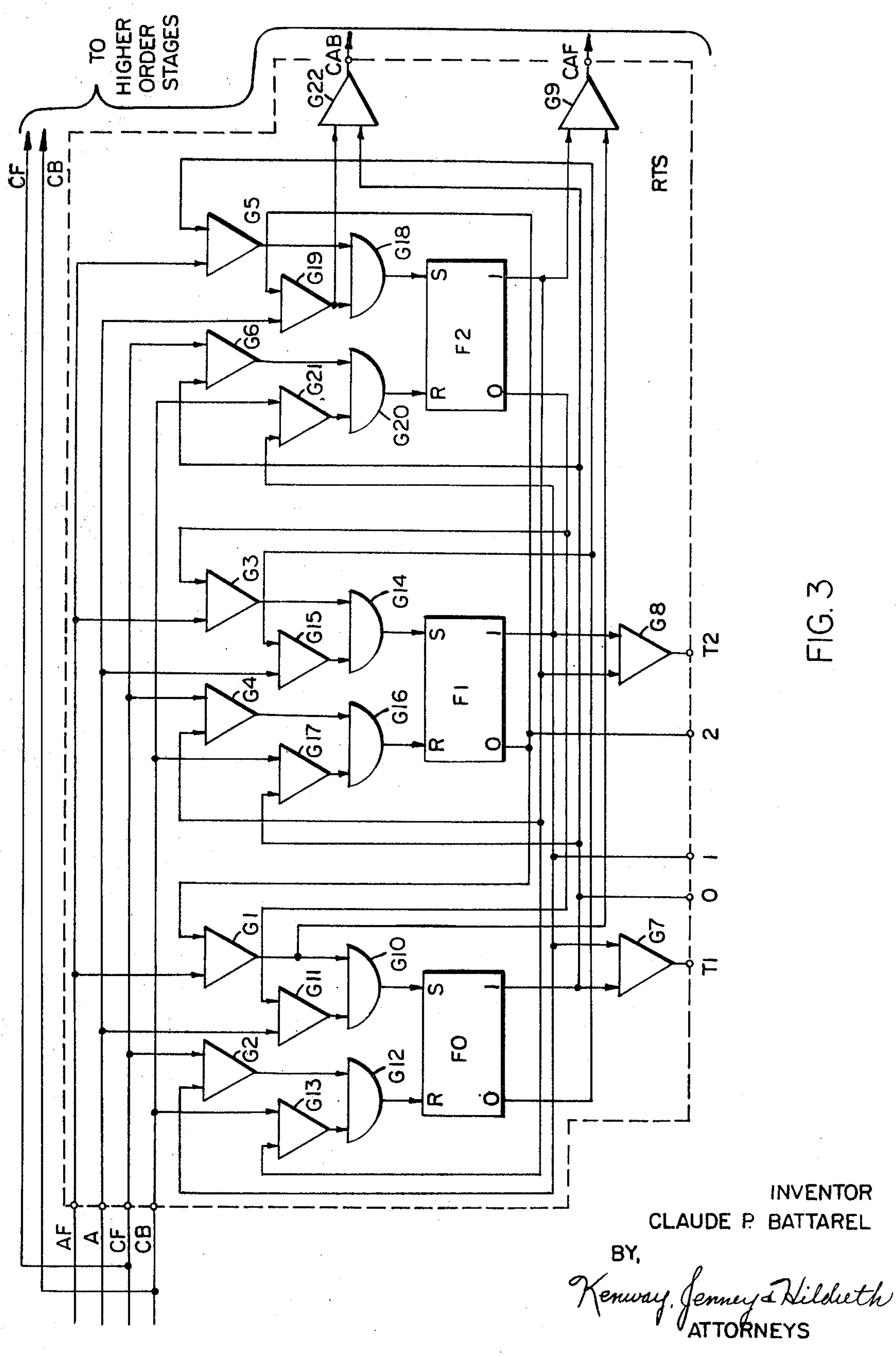
FIG. 3 is a schematic diagram of a reversible tri-stable circuit in accordance with my invention.

FIG. 3 shows a reversible stage RTS. The apparatus employed for a forward counting is the same as that shown in FIG. 1 and has been given corresponding reference characters. Additional gates are provided to permit reverse counting and the production of a "carry back" signal for succeeding stages.

Specifically, the stage RTS comprises three flip-flops F0, F1 and F2 which may be the same as described in connection with FIG. 1. These flip-flops are provided with set gates G1, G3 and G5, respectively, and reset gates G2, G4 and G6, respectively, as in FIG. 1. However, these AND gates are connected to the input terminals of the flip-flops through OR gates that also have input terminals receiving the outputs of gates used in reverse counting. Thus, the gate G1 is connected to the set terminal S of the flip-flop F0 through an OR gate G10. The gate G10 has a second input terminal connected to the output terminals of an AND gate G11. The gate G2 is connected to the reset terminal R of the flip-flop F0 through an OR gate G12. The gate G12 has a second input terminal connected to the output terminal of an AND gate G13. The gate G3 is connected to the set input terminal S of the flip-flop F1 through an OR gate G14. The gate G14 has a second input terminal connected to the output terminal of an AND gate G15. The gate G4 is connected to the reset terminal R of the flip-flop F1 through an OR gate G16, and the latter has a second input terminal connected to the output terminal of an AND gate G17. Similarly, the gate G5 is connected to the input terminal S of the flip-flop F2 through an OR gate G18, and the latter has a second input terminal connected to the output terminal of an AND gate G19. The gate G6 is connected to the input terminal R of the flip-flop F2 through an OR gate G20, and the latter has a second input terminal connected to the output terminal of an AND gate G21.

Transition signals are produced by the transitions between ternary 0 and ternary 1 and between ternary 1 and ternary 2 of the stage RTS by gates G7 and G8, in the same manner as described in connection with FIG. 1. The gate G9 is provided to produce a carry forward signal CAF in the same manner as the gate G9 in FIG. 1. For forward counting, the stage RTS is controlled by "advance" pulses applied to input terminal AF, and "clock forward" pulses are supplied to terminal CF in the same manner as the counting of the stage TS in FIG. 1 is controlled by corresponding pulses applied to the input terminals A and C. For reverse counting, "advance backward" pulses may be applied to an input terminal AB, and followed by "clock backward" pulses CB applied to input terminal CB. As in the embodiment shown in FIG. 1, the clock pulses CF and CB may be applied to all stages in parallel, as they will not affect proper operation. Each such pulse is only effective when the stage to which it is applied is in a transition state, and then will only affect the flip-flop which is required to be reset. Thus, additional clock pulses do not affect the operation of the circuit.

The "advance backward" pulses applied to the input terminal AB are supplied to each of the AND gates G11, G15 and G19. The gate G11 has a second input terminal connected to the logic 0 output terminal of the flip-flop F2. The AND gate G15 has a second input terminal connected to the logic 0 output terminal of the flip-flop F0. The gate C19 has a second input terminal connected to the logic 0 output terminal of the flip-flop F1. Thus, the flip-flop F0 can be set by a pulse AB only when the flip-flop F2 is in its reset state, the flip-flop F1 can be set only when the flip-flop F0 is in its reset state, and the flip-flop F2 can be set only when the flip-flop F1 is in its reset state.

The input terminal CB is connected to the AND gates G13, G17 and G21. The gate G13 has a second input terminal connected to the logic 1 output terminal of the flip-flop F2. The gate G17 has a second input terminal connected to t he logic 1 output terminal of the flip-flop F0. The gate G21 has a second input terminal connected to the logic 1 output terminal of the flip-flop F1. The flip-flop F0 can thus be reset by a pulse CB only when the flip-flop F2 is in its logic 1 state. The flip-flop F1 can be reset by the gate G17 only when the flip-flop G0 is in its set state. The flip-flop F2 can be reset by the gate G21 only when the flip-flop F1 is in its set state.

The "carry backward" pulses are produced by an AND gate G22. This gate has a first input terminal connected to the output terminal of the gate G19, and a second input terminal connected to the logic 1 output terminal of the flip-flop F0. The "carry backward" pulse CAB is thus produced when an "advance backward" pulse AB is applied to the gate G19 with the flip-flop F1 in its reset state and the flip-flop F0 in its set state. That occurs when the stage RTS is being set from its logic 0 back to its logic 2 state, requiring one count to be subtracted from the next following stage.

Figure 4:
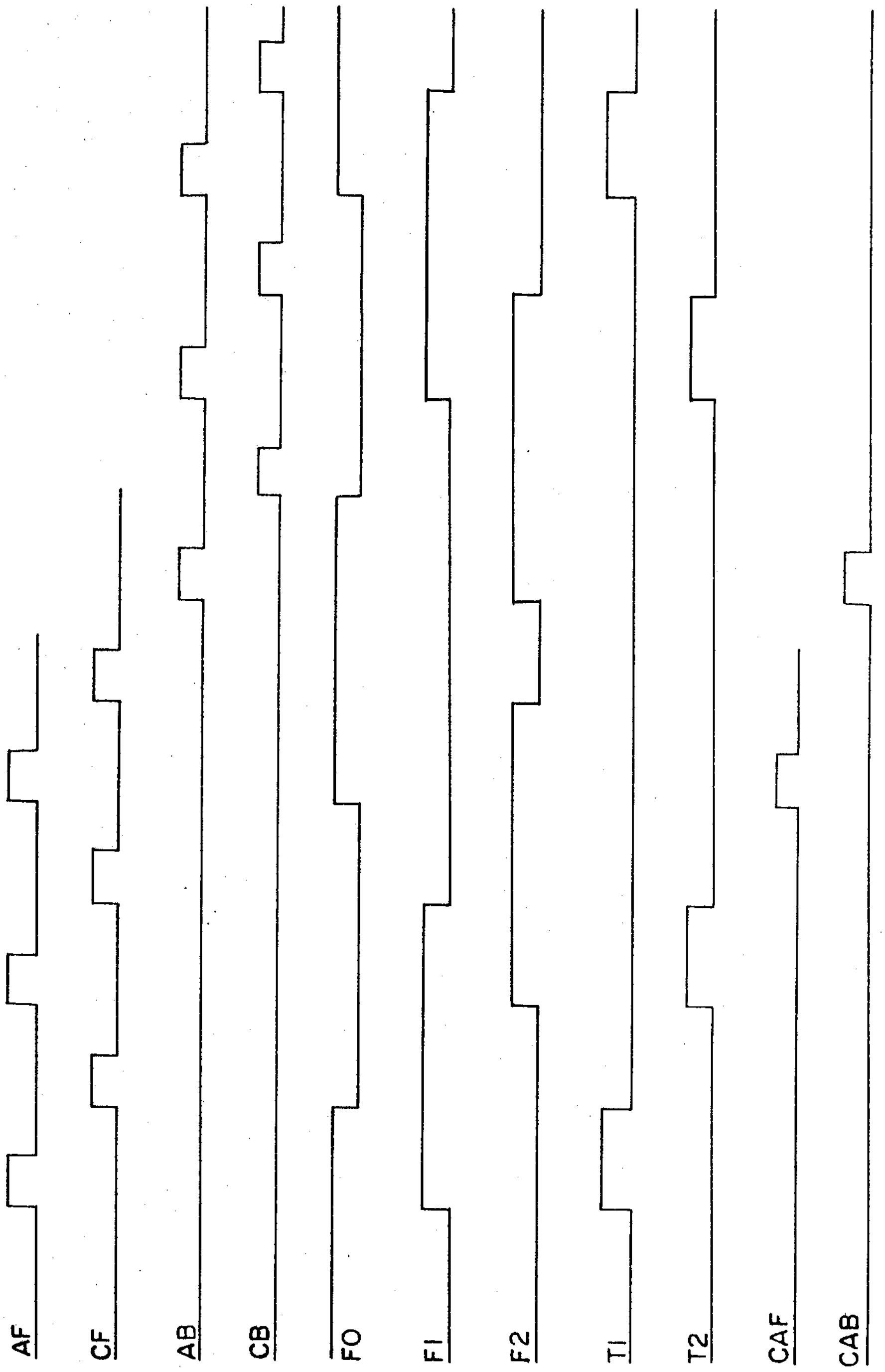
FIG. 4 is a timing chart illustrating the sequence of operation of the circuit of FIG. 3.

FIG. 4 shows the counting sequence of the apparatus of FIG. 3 in response to a series of advance pulses AF each followed by a clock pulse CF, and then in response to a series of backward pulses AB followed by corresponding clock pulses CB. Beginning with the stage RTS in its ternary 0 state, with the flip-flop F0 set and the flip-flops F1 and F2 reset, the first pulse AF causes the flip-flop F1 to be set by the gate G3. The transition pulse T1 is then produced by the gate G7. The clock pulse CF causes the flip-flop F0 to be reset by the gate G2. The next pulse AF causes the flip-flop F2 to be set by the gate G5, and the transition pulse T2 is produced by the gate G8. The next following clock pulse CF will cause the flip-flop F1 to be reset by the gate G4. At this time the stage RTS is in its ternary 2 state. The following pulse AF will cause the flip-flop F0 to be set, and a carry forward pulse CAF to be produced by the gate G9. The following clock pulse CF will reset the flip-flop F2 and the apparatus will be restored to its original state.

FIG. 4 next shows the effect of a series of advance backward pulses AB each followed by a clock backward pulse CB. The first pulse AB causes the flip-flop F2 to be set by the gate G19. At the same time, the gate G22 produces a carry backward pulse CAB, as the stage is being set from ternary 0 to ternary 2. The following pulse CB will reset the flip-flop F0 through the gate G13. The next pulse AB will cause the flip-flop F1 to be reset by the gate G15. The transition pulse T2 will now be produced by the gate G8, indicating in this case a transition from ternary 2 to ternary 1. At the next CB pulse, the flip-flop F2 will be reset. The following pulse AB will set the flip-flop F0, and cause the transition pulse T1 to be produced by the gate G7. In this instance, pulse T1 indicates the transition from ternary 1 to ternary 0 in the reverse counting mode. Finally, the next pulse CB will reset the flip-flop through the gate G17, and the apparatus will again be restored to its initial condition.

Figure 5:
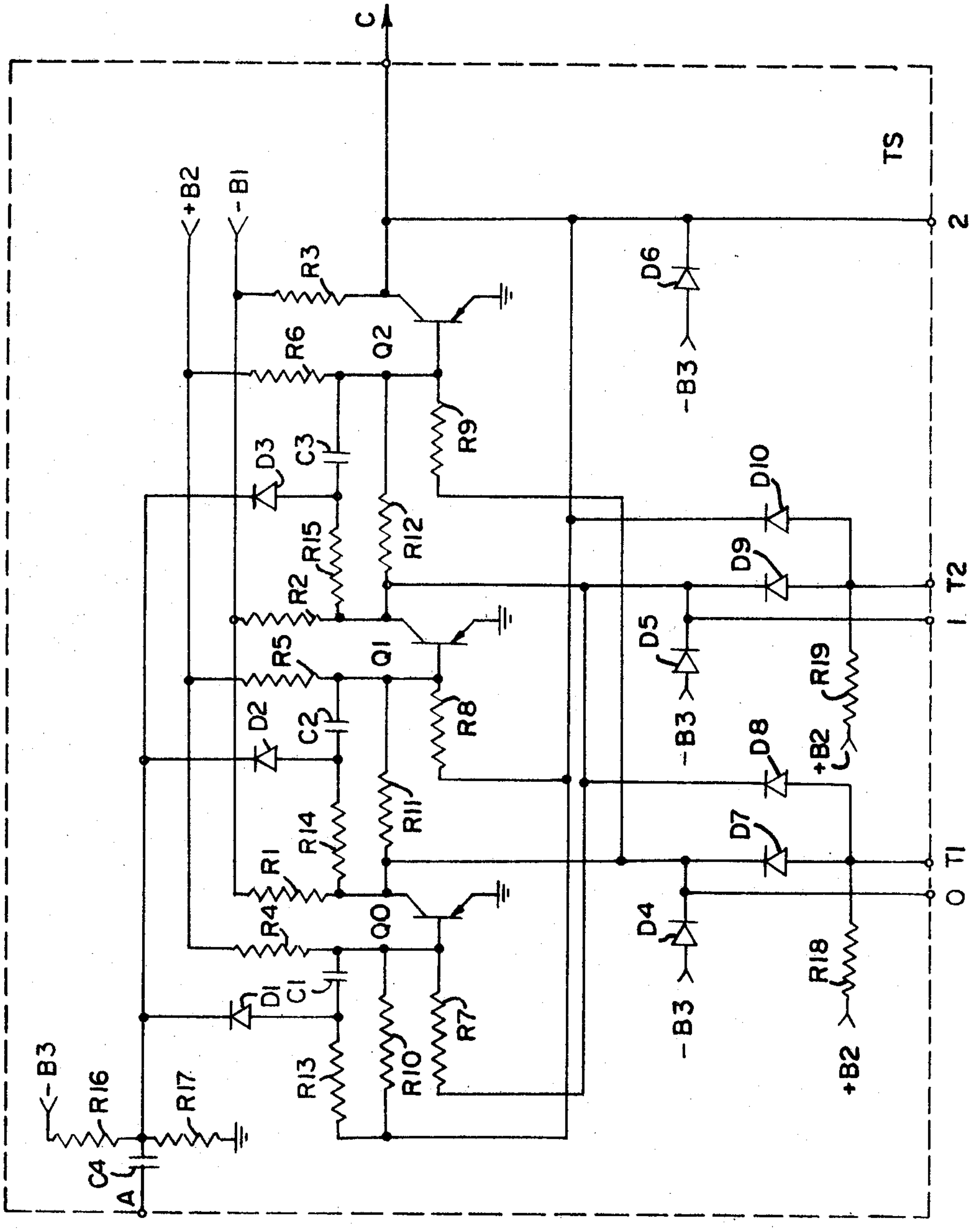
FIG. 5 is a schematic diagram of a tri-stable circuit in accordance with the preferred embodiment of my invention.

FIG. 5 shows a preferred embodiment of a ternary stage TS in accordance with my invention. The apparatus includes as switches three transistors Q0, Q1 and Q2, and does not require the use of clock pulses. While various other switching devices could be used, as shown the transistors Q0, Q1 and Q2 are each of the pnp type with emitters grounded.

The transistor Q0 has its collector returned to a suitable source of negative potential —B1 through a resistor R1. Identical resistors R2 and R3 are connected between the collectors of the transistors Q1 and Q2, respectively, and the terminal B1. The base of the transistor Q0 is connected to a terminal B2 of a positive voltage source with respect to ground through a resistor R4. Similarly, resistors R5 and R6 are connected between the bases of the transistors Q1 and Q2, respectively, and the terminal B2. The base of the transistor Q0 is connected to the collector of the transistor Q1 through a resistor R7. Similarly, the base of the transistor Q1 is connected to the collector of the transistor Q2 through a resistor R8 and the base of the transistor Q2 is connected to the collector of the transistor Q0 through a resistor R9. The base of the transistor Q0 is also connected to the collector of the transistor Q2 through a resistor R10. Similarly, the base of the transistor Q1 is connected to the collector of the transistor Q0 through a resistor R11, and the base of the transistor Q2 is connected to the collector of the transistor Q1 through a resistor R12.

A capacitor C1 and a resistor R13 are connected in series between the base of the transistor Q0 and the collector of the transistor Q2. Similarly, a capacitor C2 and a resistor R14 are connected between the base of the transistor Q1 and the collector of the transistor Q0, and a capacitor C3 and a resistor R15 are connected in series between the base of the transistor Q2 and the collector of the transistor Q1.

A potential divider is provided which consists of a pair of resistors R16 and R17 connected in series between a suitable source of negative potential B3 and ground. A capacitor C4 is connected between the junction of the resistors R16 and R17 and an input terminal A. The junction of the resistors R16 and R17 is connected through a diode D1 to the junction of the capacitor C1 and the resistor R13, through a diode D2 to the junction of the capacitor C2 and the resistor R14, and through a diode D3 to the junction of the capacitor C3 and the resistor R15.

The collectors of the transistors Q0, Q1 and Q2 are clamped to prevent them from going below the potential B3 by three diodes D4, D5 and D6, each connected between the terminal B3 and a respective one of the transistor collectors.

An AND gate comprising a pair of diodes D7 and D8 is provided to produce a transition signal T1 at the correspondingly labelled output terminal of stage TS. For this purpose, the diode D7 is connected between the terminal T1 and the collector of the transistor Q0, and a diode D8 is connected between the terminal T1 and the collector of the transistor Q1. The terminal T1 is also connected to the positive potential source terminal B2 through a resistor R18. So long as either of the transistors Q0 and Q1 is cut off, the potential at the terminal T1 will be substantially that of the negative terminal B3. However, when both transistors are conducting, the potential at the terminal T1 will rise approximately to ground potential. As will appear, that condition will occur as the stage is set from its ternary 0 to its ternary 1 state.

A second AND gate comprising a pair of diodes D9 and D10 is provided to produce a signal T2 at the correspondingly labelled terminal in FIG. 5 when both transistors Q1 and Q2 are conducting. For this purpose, the diode D9 is connected between the terminal T2 and the collector of the transistor Q1, and the diode D10 is connected between the terminal T2 and the collector of the transistor Q2. The terminal T2 is also connected to the positive potential source B2 through a resistor R19.

While various values of the component values can be employed, in accordance with a preferred embodiment of my invention, the following values are employed in the circuit of FIG. 5:

R1, R2 and R3, 5000 ohms;
R4, R5 and R6, 20000 ohms;
R7, R8 and R9, 13000 ohms;
R10, R11 and R12, 13000 ohms;
R13, R14 and R15, 20000 ohms;
R16, 10000 ohms;
R17, 20000 ohms;
R18 and R19, 15000 ohms;
C1, C2 and C3, 50 picofarads;
C4, 100 picofarads;
B1, −20 volts;
B2, +14 volts; and
B3, −6 volts.

Operation of the circuit of FIG. 5 will be more readily understood if the logical operations performed are first considered. Note that there is a summing junction at the base of each transistor formed at the junction of two resistors, each connected to a collector of another transistor in the set of three, a third resistor connected to terminal B2, and one terminal of a capacitor, the latter forming the output terminal for a pulse gate in a manner to be described. Specifically, for the transistor Q1, for example, the summing junction is formed at the junction of the resistors R5, R8 and R11 and the capacitor C2. Assuming no current flow through the capacitor C2, the values of the resistors are selected so that if both of the transistors Q0 and Q2 are cut off, with their collectors clamped near the negative potential B3, the base of the transistor Q1 will be forward-biased with respect to its emitter. The transistor Q1 will then conduct saturation current, bringing its collector near ground potential. On the other hand, if either of the transistors Q0 and Q2 is conducting with its collector near ground potential, the base of the transistor Q1 will be reverse-biased, and the transistor Q1 will be cut off.

The capacitor C2, resistor 14 and diode D2 form a pulse gate for at times gating the transistor Q1 into conduction under the control of the transistor Q0. The resistors R16 and R17 are selected so that the steady state voltage at their junction is more positive than the voltage at the collector of the transistor Q0 when the latter is cut off. The diode D2 is blocked under these circumstances, and a negative voltage pulse equal to B3 applied to terminal A will not produce current flow through the diode D2. However, if the transistor Q0 is conducting, such a pulse applied to terminal A will draw current through the diode D2 and the capacitor C2 to bias the transistor Q1 into conduction.

The two conditions under which the transistor Q1 can be made conducting can be expressed logically by the equation:

$$Q1=A\cdot Q0+\overline{Q0}\cdot\overline{Q2}$$

where an unbarred symbol means the transistor is conducting, a barred symbol means the transistor is not conducting, A represents a negative pulse applied to terminal A, the "·" means AND, and the "+" means OR. The transistors Q0 and Q2 are similarly connected, and their correspondingly logical equations are:

$$Q0=A\cdot Q2+\overline{Q1}\cdot\overline{Q2}$$

$$Q2+A\cdot Q1+\overline{Q0}\cdot\overline{Q1}$$

These equations establish the tristable nature of the circuit, as they imply stability (in the absence of a pulse A) when and only when one transistor is conducting and the other two are cut off.

Figure 6:
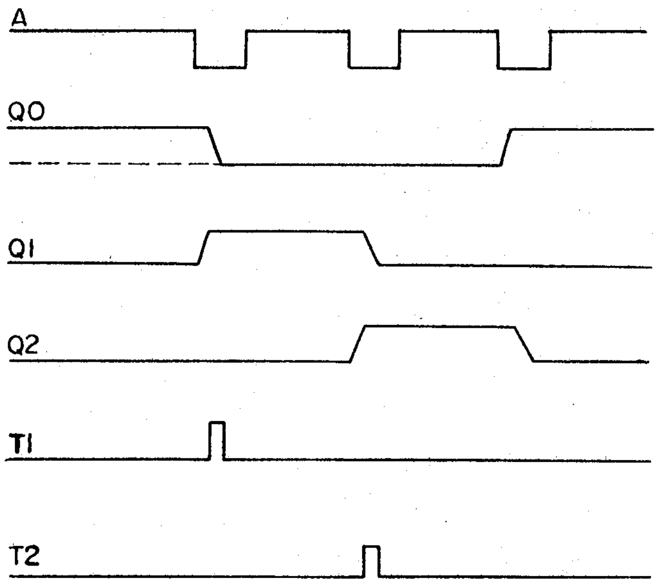
FIG. 6 is a timing chart illustrating the sequence of operation of the circuit of FIG. 5.

The sequential operation of the circuit of FIG. 5 will be considered in conjunction with the timing diagram of FIG. 6. Counting is accomplished by negative pulses applied between the input terminal A and ground. In the specific embodiment described above a −6 volt transition is required for this purpose. Assume that the stage TS in FIG. 5 is in the ternary 0 state, with transistor Q0 conducting and transistors Q1 and Q2 cut off. When a first negative pulse is applied to terminal A of the stage TS, a pulse will be coupled through the capacitor C4 to the junction of the resistors R16 and R17, which in the quiescent state will be at a potential of about −3 volts. A negative transition pulse will be coupled through the diode D2 and the capacitor C2 to forward-bias the emitter base junction of the transistor Q1 and cause the transistor Q1 to go into saturation conduction. When the transistor Q1 goes into conduction, the potential at tis collector will rise and this rising potential will act through the resistor R7 to cut off the transistor Q2. During a brief interval in which both transistors Q1 and Q0 are conducting, the transition pulse T1 will be produced. When Q0 is cut off and Q1 remains in conduction, the stage is in its ternary 1 state in which the output terminal labelled 1 will be substantially at ground potential and the terminals labelled 0 and 2 will be at a negative potential substantially equal to B3.

When the next puse A is received, the transistor Q2 will be turned on by a pulse through the diode D3 and the capacitor C3 to bias its base forwardly with respect to its emitter. When the transistor Q2 goes into conduction, the rise in its collector potential will turn off the transistor Q1 through the resistor R8. While both transistors Q1 and Q2 are conducting, the transition pulse T2 will be produced. When the transistor Q1 is cut off, the stage TS is in its ternary 2 state with its output terminal 2 substantially at ground potential and terminals 0 and 1 at −B3.

At the third A pulse, the transistor Q0 will be turned on through the diode D1 and the capacitor C1, and when it is turned on it will cut off the transistor Q2 through the resistor R9. The stage will then be in its initial condition.

Figure 7:
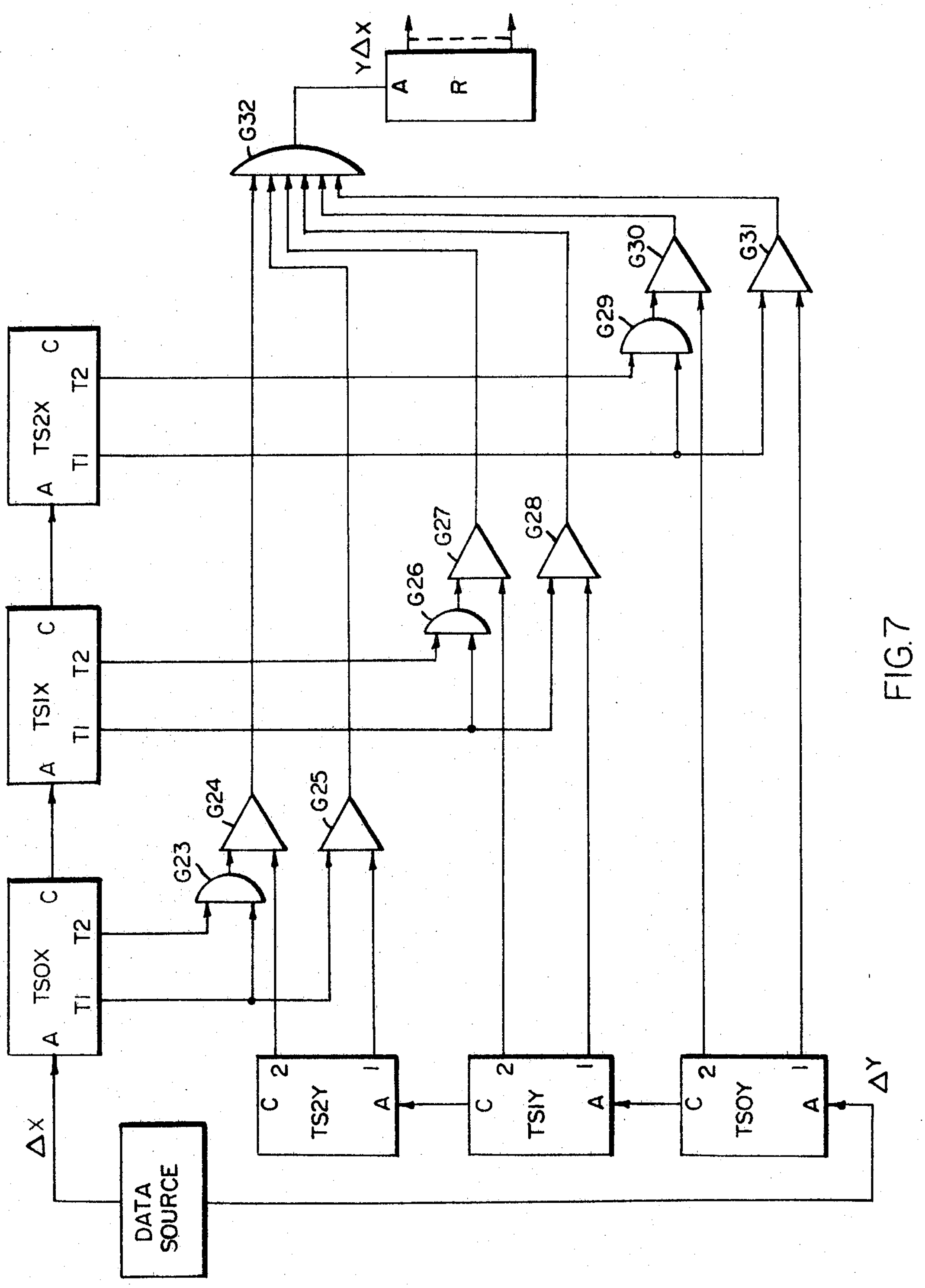
FIG. 7 is a schematic wiring diagram of a ternary integrator comprising a pulse multiplier in accordance with my invention.

FIG. 7 shows a pulse multiplier incorporating ternary stages which may be of the type shown in FIG. 5. The apparatus comprises a first counter consisting of three ternary stages TS0X, TS1X and TS2X. As shown, the carry output of the first stage TS0X is connected to the advance input terminal A of the next stage TS1X, and the carry output terminal C of the stage TS1X is connected to the advance input terminal A of the stage TS2X. There is thus formed a three-stage ternary counter that may be advanced by pulses applied to the input terminal A of the first stage TS0X. While connections have been shown for the circuit of FIG. 5 as the stage TS0X, it will be apparent that the circuits of FIGS. 1 and 3 could be employed if suitable "clock" pulse input terminals were provided. Input pulses representing increments in an independent variable X, labelled ΔX, are provided by a suitable data source, such as a computer memory or the like.

A Y register is provided in the form of a three-stage ternary counter consisting of ternary stages TS0Y, TS1Y and TS2Y. These stages are also interconnected to form a three-stage ternary counter, and are adapted to receive input pulses ΔY from the data source corresponding to increments in a variable Y assumed to be dependent on the variable X.

The transition output terminals T1 and T2 of the first stage of the X register TS0X are connected to the input terminals of a conventional OR gate G23. The output terminal of the OR gate G23 is connected to one input terminal of an AND gate G24. The ternary 2 output terminal of the stage TS2Y is connected to the other input terminal of the gate G24. The most significant digit of the integrand Y stored in the Y register appears in the stage TS2Y, and when that stage is at ternary 2 a transition either from 0 to 1 or from 1 to 2 in the first stage of the X register will be gated through the gate G24.

The transition terminal T1 of the first stage TS0X is connected to one input terminal of an AND gate G25. The ternary 1 output terminal of the stage TS2Y is connected to the other input terminal of the gate G25. Thus, the gate G25 will produce an output pulse when the most significant digit in the Y register is ternary 1 and a transition from 0 to 1 is produced in the first stage of the X register.

The transition output terminals T1 and T2 of the stage TS1X are connected to the input terminals of an OR gate G26. This gate has its output terminal connected to one input terminal of an AND gate G27. The gate G27 has a second input terminal connected to the ternary 2 output terminal of the second stage TS1Y of the Y register.

The transition output terminal T1 of the stage TS1X is connected to one input terminal of an AND gate G28. A second input terminal of the gate G28 is connected to the terary 1 output terminal of the stage TS1Y.

The transition output terminals T1 and T2 of the third stage TS2X of the X register are connected to the input terminals of an OR gate G29. The output terminal of the gate G29 is connected to one input terminal of an AND gate G30. A second input terminal of the AND gate G30 is connected to the ternary 2 ouput terminal of the first stage TS0Y of the Y register.

The transition output terminal T1 of the stage TS2X is connected to one input terminal of an AND gate G31. A second input terminal of the AND gate G31 is connected to the ternary 1 output terminal of the stage TS0Y.

The output terminals of each of the OR gates G24, G25, G27, G28, G30 and G31 are connected to the input terminals of an OR gate G32. The output terminal of the gate G32 is connected to the advance terminal of the register R.

The operation of the apparatus of FIG. 7 will best be understood in the context of the following table, in which the counting sequence is set forth from ternary 000 to ternary 222 as the X register is advanced over its full scale. At each count, the transition terminal of the stages TS0X, TS1X and TS2X which produces an output pulse just prior to the stage assuming the state representing the count is shown. Thus, as the X register is set from 0 to 1, the transition terminal T1 of the stage TS0X is energized, and when it is set from 001 to 002, the transition terminal T2 is energized.

| | Transitions | | |
|---|---|---|---|
| | TS0X | TS1X | TS2X |
| X counter state: | | | |
| 000 | | | |
| 001 | T1 | | |
| 002 | T2 | | |
| 010 | | T1 | |
| 011 | T1 | | |
| 012 | T2 | | |
| 020 | | T2 | |
| 021 | T1 | | |
| 022 | T2 | | |
| 100 | | | T1 |
| 101 | T1 | | |
| 102 | T2 | | |
| 110 | | T1 | |
| 111 | T1 | | |
| 112 | T2 | | |
| 120 | | T2 | |
| 121 | T1 | | |
| 122 | T2 | | |
| 200 | | | T2 |
| 201 | T1 | | |
| 202 | T2 | | |
| 210 | | T1 | |
| 211 | T1 | | |
| 212 | T2 | | |
| 220 | | T2 | |
| 221 | T1 | | |
| 222 | T2 | | |

It will be apparent that one transition output terminal of one of the stages produces an output pulse for each count. Further, the stage TS0X produces transition pulses for two-thirds of the input pulses supplied to the stage TS0X, the stage TS1X produces a transition output on one of its terminals for two-ninths of the input pulses, and the output terminals of the stage TS2X produce transition pulses for two twenty-sevenths of the input pulses supplied. All of the output transition pulses produced by the stage TS0X are supplied to the register R by way of the gates G23, G24 and G32 when the most significant digit in the Y register is ternary 2. One half of all of the transition pulses produced by the stage TS0X are supplied to the register R when the most significant digit in the Y register is ternary 1. Thus, when the output terminal 1 of the stage TS2Y is at logic 1 potential, and a transition pulse is produced by the terminal T1 of the stage TS0X, the gate G25 passes a pulse through the gate G32 to the register R.

When the digit stored in the ternary register TS1Y is logic 2, the gate G27 is enabled to pass all of the transitions occurring in the register TS1X, comprising two-ninths of the total transitions occurring in the X register. When the bit in the register TS1Y is logic 1, the gate G28 passes one-half of the transition pulses produced by the stage TS1X. Similarly, the gate G30 is enabled to pass all of the transitions in the register TS2X when the bit stored in the register TS0Y is logic 2. Half of the transition pulses produced in the register TS2X are gated to the register R by the gate G31 when a logic 1 is stored in the register TS0Y. Thus, if the contents of the Y register are defined as a ternary fraction between 0 and 1 and expressed as:

$$Y=\sum_{i=1}^{n} a_i 3^{-i}$$

where A*i* is selected from the set 0, 1 and 2, the number of output pulses supplied to the register R is equal to the number of ΔX input pulses times that binary fraction. The contents of the register R can then be expressed YΔX. It will be apparent that as the rate of production of ΔX pulses is increased with respect to the rate of change of Y with respect to X, the contents of the register R will approach the integral of YΔX. As is conventional, the register R may be divided into two registers, one holding increments in the integral and transferring them to the second one which stores the value of the integral used in other computations.

Figure 8:
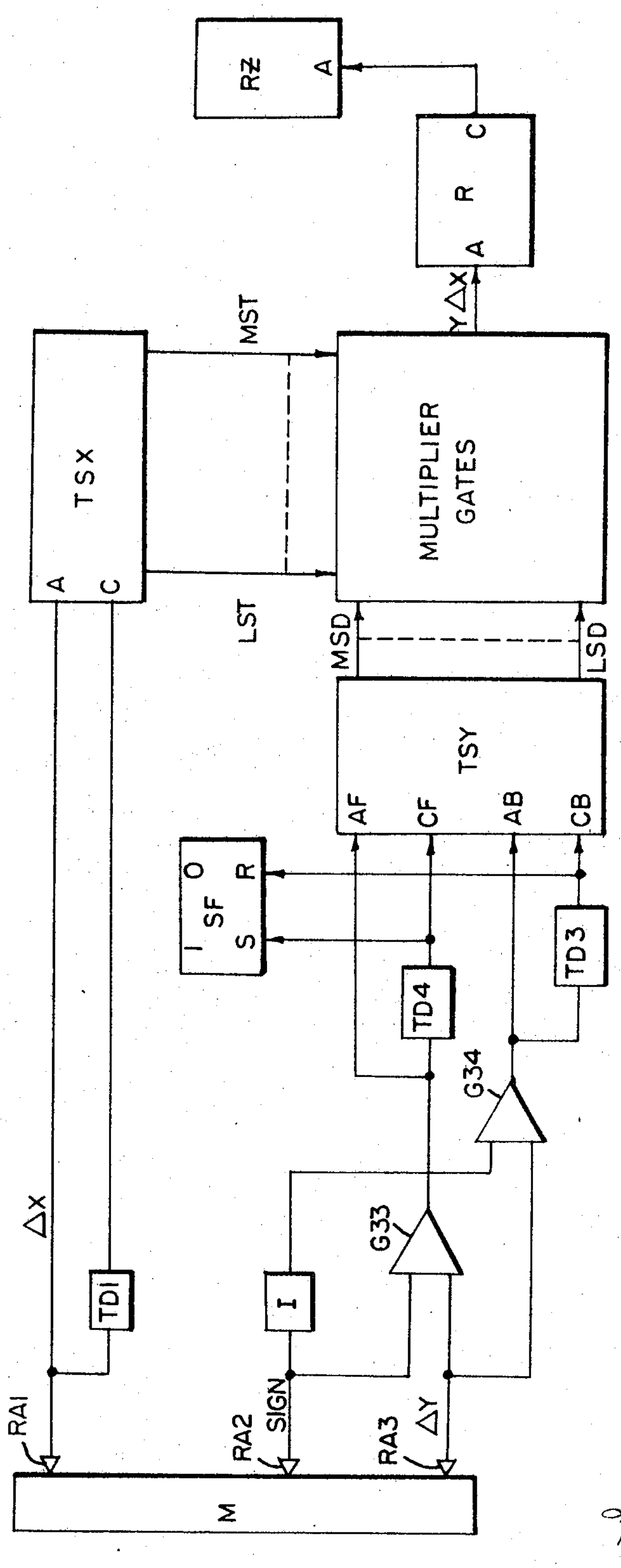
FIG. 8 is a schematic diagram of a second form of ternary integrator in accordance with my invention.

FIG. 8 illustrates schematically a more general integrator, in which the X register may comprise a series of stages such as that shown in FIG. 1 interconnected to form a ternary counter, and the Y register comprises counter stages of the type shown in FIG. 3 which can be incremented in either direction. As schematically illustrated, the apparatus is arranged to receive information from a suitable storage unit, here illustrated as a magnetic drum M. ΔX pulses are supplied from the drum M to the input terminal A of the first stage of the counter TSX by means of a suitable read amplifier RA1 and associated circuitry well known to those skilled in the art. As schematically indicated, the correct pulses C are supplied from the ΔX pulses by means of a delay line TD1. Information stored on the drum as to the successive increments in the dependent variable Y are provided by a read amplified RA3, and the signs of the increments are supplied by a read amplifier RA2. The output information may be in the form of logic 1 signals for a positive sign and the same polarity for the Y increments regardless of sign, with a logic 0 input provided by the amplifier RA2 when the sign is negative. An AND gate G33 thus provides an advance pulse for the terminal AF of the first stage of the counter TSY when the sign is positive, and a delay line TD2 provides a corresponding correct forward pulse CF. When the sign is negative, an inverter I produces an output enabling the gate G34 to produce an advance back pulse AB, and a delay line TD3 produces a corresponding correct back pulse CB. As indicated, the sign may be registered by a suitable bistable circuit such as a flip-flop SF, and employed to appropriately control the logic of the following stages. As indicated, the registers TSX and TSY are connected to a series of multiplier gates of the kind described in connection with FIG. 7, with the most significant digit in the Y register controlling the least significant stage of the X register. The output from the multiplier gates, labelled YΔX, is supplied to an intermediate register R, and in increments, to an integral register RZ. The flip-flop SF may be employed to appropriately direct upward or downward counting in the registers R and RZ in a manner that will be apparent to those skilled in the art and which is not shown.

While I have described my invention with respect to the details of various illustrative embodiments thereof, many changes and variations will occur to those skilled in the art upon reading my description, and such can obviously be made without departing from the scope of my invention.

Having thus described my invention, what I claim is:

1. A ternary pulse multiplier comprising a first ternary counter having a predetermined number of stages each settable to any of three stable states, first transition indicating means controlled by each stage of said counter for producing a first output signal when the stage is set from a first state to a second state, second transition indicating means controlled by each stage of the counter for producing a second output signal when the stage is set from said second state to a third state, a second ternary counter having said predetermined number of stages each settable to any of three stable states, first gate means for each stage of said first counter controlled by both of the transition indicating means for that stage and by a stage of the second counter to produce a third output signal when said stage of the second counter is set to its ternary 2 state and one of said first and second output signals is produced, said second counter stages being arranged in an ordered sequence such that the highest ordered stage of the second counter controls the first gate means for the lowest ordered stage of the first counter and the lowest ordered stage of the second counter controls the first gate means for the highest ordered stage of the first counter, second gate means for each stage of the first counter controlled by the first transition indicating means for that stage and by the stage of the second counter controlling the corresponding first gate means for producing a fourth output signal when said second counter stage is in the ternary 1 state and a first output signal is produced, an output terminal, and means for applying all of said third and fourth output signals to said output terminal.

2. A ternary pulse multiplier, comprising first and second ternary registers each comprising a series of the same number of tristable stages ordered from a lowest ordered stage to a highest ordered stage, the stages of said first register being interconnected to form a ternary counter advanceable by pulses applied to the lowest ordered stage, each stage of said first register being associated with an inversely ordered stage of the second register, means controlled by each stage of the first register and the associated stage of the second register for producing an output signal for each advance of the first register stage from ternary 0 to ternary 1 and from ternary 1 to ternary 2 when the associated stage of the second register is set to ternary 2, means controlled by each stage of the first register and the associated stage of the second register for producing an output signal for each advance of the first register stage from ternary 0 to ternary 1 when the associated stage of the second register is set to ternary 1, an output terminal, and means for applying all of said output signals to said output terminal.

3. A circuit in accordance with claim 2 and further including a third register connected to said output terminal to store said output signals.

4. A pulse multiplier, comprising a ternary counter having a plurality of tristable stages each settable to ternary 0, 1 and 2 states, first transition indicating means controlled by each stage of the counter for producing a first transition signal when the stage is set from 0 to 1, second transition indicating means controlled by each stage of the counter for producing a second transition signal when the stage is set from 1 to 2, a ternary register having a tristable stage for each stage of said counter, each being settable to ternary 0, 1 and 2 states, first gate means for each stage of said counter controlled by a different stage of said register and by both of the transition indicating means for the counter stage for producing an output signal when the register stage is set to 2 and a transition signal is produced, second gate means for each stage of said counter controlled by the stage of the register controlling the first gate means and by said first transition indicating means for producing an output signal when the register stage is set to 1 and a first transition signal is produced, and an OR gate controlled by said first and second gate means for supplying said output signals to a single circuit.

5. A circuit in accordance with claim 4, and further comprising a ternary register settable to ternary 0, 1 and 2 states, a first OR gate connected to said first and second gate means to produce an output pulse when either gate means produces an output pulse, an AND gate connected to said OR gate and to said ternary register to produce an output pulse when said OR gate produces an output pulse and said ternary register is set to its ternary 2 state, an AND gate connected to said first gate means and to said ternary register to produce an output pulse when said first gate means produces an output pulse and said ternary register is in its ternary 1 state, and a second OR gate connected to said AND gates to produce an output pulse when either AND gate produces an output pulse.

6. An integrator, comprising a series of tristable circuits, each in accordance with claim 5, in which each of the tristable circuits are in an ordered sequence with the load circuit of one switch of each circuit but the last connected to the pulse gate of the next circuit to form a counter, and in which said second OR gate is common to all of said circuits, and further comprising a result register connected to said second OR gate to store a digital signal representing a number equal to all the pulses produced by said second OR gate, whereby said result register will store the integral of a variable Y representable as a value between 0 and 1 with respect to a variable X when the counter is advanced in increments of X by pulses applied to the first of the circuits of claim 8 and the ternary registers are loaded with values of Y corresponding to current accumulated values of X with the highest ordered bit of the value of Y being stored in the ternary register connected to the gates controlled by the first of the circuits of the counter, the lowest ordered bit of the value of Y stored in the ternary register connected to the gates controlled by the last of the circuits of the counter, and intermediate bits being stored in descending ternary order in the intermediate ternary registers.

7. A pulse counter comprising, a series of tristable circuits, each comprising three electronic switches each having a conducting and a non-conducting state and each having a control circuit and a load circuit, each control circuit for each switch comprising a biasing circuit controlled by the load circuits of the other switches for biasing the switch to its conducting state when the other switches are in their non-conducting states and biasing the switch to its non-conducting state when either of the other switches is in its conducting state, and a pulse gate for each switch controlled by another one of the switches in its conducting state for admitting an applied pulse to set the switch to its conducting state, whereby application of a pulse to said pulse gate when one of the switches is conducting will set another switch to its conducting state and thereby set the initially conducting switch to its non-conducting state and wherein one switch of each circuit except the last has its load circuit connected to the pulse gate in the series and the last circuit has its load circuit connected to the pulse gate of the first circuit to produce carry pulses to advance the count stored in each circuit as the preceding circuit completes a ternary counting sequence.

No references cited.

EUGENE G. BOTZ, Primary Examiner

C. E. ATKINSON, Assistant Examiner

U.S. Cl. X.R.

235—150.3, 164; 328—159

UNITED STATES PATENT OFFICE

CERTIFICATE OF CORRECTION

Patent No. 3,514,584 Dated May 26, 1970

Inventor(s) C. P. Battarel

It is certified that error appears in the above-identified patent and that said Letters Patent are hereby corrected as shown below:

Column 3, line 6, "position" should read --positive--;

line 7, "inut" should read --input--;

line 33, "gtae" should read --gate--.

Column 4, line 7, "opeartion" should read --operation--.

Column 5, line 53, "GO" should read --FO--.

Column 8, line 45, "tis" should read --its--;

line 55, "puse" should read --pulse--.

Column 14, line 18, delete "No references cited" and insert:

References Cited

UNITED STATES PATENTS

| | | | |
|---|---|---|---|
| 2,913,179 | 11/1959 | Gordon | 235--164 |
| 3,050,251 | 8/1962 | Steele | 235--164 |

UNITED STATES PATENT OFFICE
CERTIFICATE OF CORRECTION -- Page 2

Patent No. 3,514,584 Dated May 26, 1970

Inventor(s) C. P. Battarel

It is certified that error appears in the above-identified patent and that said Letters Patent are hereby corrected as shown below:

| | | | |
|---|---|---|---|
| 3,310,660 | 3/1967 | Cogar............ | 235--92 |
| 3,340,387 | 9/1967 | Anderson......... | 235--150.3 |
| 3,354,295 | 11/1967 | Kulka............ | 235--92 |
| 3,408,644 | 10/1968 | Kintner.......... | 340--347 |
| 3,430,201 | 2/1969 | Kintner.......... | 235--156 XR |

OTHER REFERENCES

Gordon, B. M., "Adapting Digital Techniques For Automatic Controls--I", Electrical Engineering, Nov. 1954, pp. 136-143, 332.

Signed and sealed this 14th day of September 1971.

(SEAL)
Attest:

EDWARD M.FLETCHER,JR.
Attesting Officer

ROBERT GOTTSCHALK
Acting Commissioner of Patents